United States Patent
Shitaba et al.

(10) Patent No.: US 10,826,110 B2
(45) Date of Patent: Nov. 3, 2020

(54) POSITIVE ELECTRODE ACTIVE MATERIAL FOR LITHIUM ION SECONDARY BATTERY, POSITIVE ELECTRODE FOR LITHIUM ION SECONDARY BATTERY, AND LITHIUM ION SECONDARY BATTERY USING THE SAME

(71) Applicant: TDK CORPORATION, Tokyo (JP)

(72) Inventors: Junpei Shitaba, Tokyo (JP); Hideaki Seki, Tokyo (JP); Masahiro Tsuchiya, Xiamen (CN)

(73) Assignee: TDK CORPORATION, Tokyo (JP)

( * ) Notice: Subject to any disclaimer, the term of this patent is extended or adjusted under 35 U.S.C. 154(b) by 54 days.

(21) Appl. No.: 15/922,095

(22) Filed: Mar. 15, 2018

(65) Prior Publication Data

US 2018/0287199 A1    Oct. 4, 2018

(30) Foreign Application Priority Data

Mar. 30, 2017    (JP) .................................. 2017-069042

(51) Int. Cl.
*H01M 10/0525*    (2010.01)
*H01M 2/16*    (2006.01)
(Continued)

(52) U.S. Cl.
CPC ......... *H01M 10/0525* (2013.01); *C01B 25/45* (2013.01); *H01M 2/1626* (2013.01);
(Continued)

(58) Field of Classification Search
CPC . C01B 25/45; H01M 10/052; H01M 10/0525; H01M 2004/027;
(Continued)

(56) References Cited

U.S. PATENT DOCUMENTS

2011/0311868 A1* 12/2011 Sano ....................... C01B 25/45
                                                              429/211
2013/0256592 A1    10/2013 Sano et al.
2013/0260226 A1    10/2013 Sano et al.

FOREIGN PATENT DOCUMENTS

JP    2013-229304 A    11/2013
JP    2013-229305 A    11/2013

OTHER PUBLICATIONS

Scientific and Technical Information Center (STIC) search results by Scott Segal (Year: 2019).*

* cited by examiner

*Primary Examiner* — Victoria H Lynch
(74) *Attorney, Agent, or Firm* — Oliff PLC

(57) ABSTRACT

A positive electrode active material for a lithium ion secondary battery is lithium vanadium phosphate represented by a following composition expression (1) and in which a peak intensity $((002)_{int}/(201)_{int})$ of a (002) plane normalized with respect to a peak intensity of a (201) plane and a peak intensity $((102)_{int}/(201)_{int})$ of a (102) plane normalized with respect to a peak intensity of the (201) plane in an X-ray diffraction pattern satisfy $0.35 \leq (002)_{int}/(201)_{int} \leq 0.53$ and $0.46 \leq (102)_{int}/(201)_{int} \leq 0.63$, respectively, $Li_xVOPO_4$ ... (1).

7 Claims, 2 Drawing Sheets

(51) Int. Cl.
*H01M 4/62* (2006.01)
*H01M 4/52* (2010.01)
*H01M 4/66* (2006.01)
*H01M 4/58* (2010.01)
*C01B 25/45* (2006.01)
*H01M 4/02* (2006.01)
*H01M 10/052* (2010.01)

(52) U.S. Cl.
CPC ........... *H01M 4/52* (2013.01); *H01M 4/5825* (2013.01); *H01M 4/623* (2013.01); *H01M 4/661* (2013.01); *H01M 10/052* (2013.01); *H01M 2004/027* (2013.01); *H01M 2004/028* (2013.01)

(58) Field of Classification Search
CPC ......... H01M 2004/028; H01M 2/1626; H01M 4/52; H01M 4/5825; H01M 4/623; H01M 4/661
See application file for complete search history.

POSITIVE ELECTRODE ACTIVE MATERIAL FOR LITHIUM ION SECONDARY BATTERY, POSITIVE ELECTRODE FOR LITHIUM ION SECONDARY BATTERY, AND LITHIUM ION SECONDARY BATTERY USING THE SAME

BACKGROUND OF THE INVENTION

Field of the Invention

The present invention relates to a positive electrode active material for a lithium ion secondary battery, a positive electrode for a lithium ion secondary battery, and a lithium ion secondary battery using these in which gas generation during charging and discharging is minimized.

Priority is claimed on Japanese Patent Application No. 2017-069042, filed Mar. 30, 2017 the content of which is incorporated herein by reference.

Description of Related Art

In the related art, as a representative positive electrode active material of a lithium ion secondary battery such as lithium cobalt oxide ($LiCoO_2$), or lithium nickel oxide ($LiNiO_2$), a lithium nickel composite oxide in which a part of lithium nickel oxide is substituted with Co, Mn, Al, or the like is used. It is known that these positive electrode active materials have a high discharge capacity but low crystal structure stability.

Although it is known that lithium vanadium phosphate has better crystal structural stability than those of these positive electrode active materials, there is a problem concerning gas generation during a cycle test.

Patent Document 1 reports that gas generation is minimized by adding vanadium to an electrolytic solution. Patent Document 2 reports that gas generation is minimized by adding sulfur to a positive electrode.

However, in the methods described in Patent Documents 1 and 2, sufficient gas generation minimizing effects cannot be obtained and thus there is a demand for further minimization of gas generation.

PATENT DOCUMENTS

[Patent Document 1] Japanese Unexamined Patent Application, First Publication No. 2013-229304
[Patent Document 2] Japanese Unexamined Patent Application, First Publication No. 2013-229305

SUMMARY OF THE INVENTION

Therefore, the present invention was made in view of the above problems in the related art, and an object of the present invention is to provide a positive electrode active material for a lithium ion secondary battery, a positive electrode for a lithium ion secondary battery, and a lithium ion secondary battery using these in which gas generation during charging and discharging is minimized.

In order to achieve the above objects, a positive electrode active material for a lithium ion secondary battery according to the present invention includes: lithium vanadium phosphate represented by a following composition expression (1) and in which a peak intensity $((002)_{int}/(201)_{int})$ of a (002) plane normalized with respect to a peak intensity of a (201) plane and a peak intensity $((102)_{int}/(201)_{int})$ of a (102) plane normalized with respect to a peak intensity of the (201) plane in an X-ray diffraction pattern satisfy $0.35 \leq (002)_{int}/(201)_{int} \leq 0.53$ and $0.46 \leq (102)_{int}/(201)_{int} \leq 0.63$, respectively:

$$Li_xVOPO_4 \qquad (1)$$

(where, x satisfies $0.05 \leq x \leq 1.1$).

The positive electrode active material for the lithium ion secondary battery according to the present invention is used so that a lithium ion secondary battery in which gas generation during charging and discharging is minimized can be provided. It is presumed that this is because, when $(002)_{int}$ and $(102)_{int}$ compared with $(201)_{int}$ of lithium vanadium phosphate satisfy conditions in the above ranges, respectively, reactivity with an electrolytic solution at an end of a lithium vanadium phosphate crystal during charging and discharging is minimized and it is difficult for the electrolytic solution to be oxidatively decomposed.

In the positive electrode active material for the lithium ion secondary battery, $(002)_{int}/(201)_{int}$ and $(102)_{int}/(201)_{int}$ may satisfy $0.39 \leq (002)_{int}/(201)_{int} \leq 0.44$ and $0.50 \leq (102)_{int}/(201)_{int} \leq 0.55$, respectively.

With such a constitution, a lithium ion secondary battery in which gas generation during charging and discharging can be minimized can be provided. It is presumed that this is because reactivity with an electrolytic solution at an end of a lithium vanadium phosphate crystal during charging and discharging is further minimized and an increase in resistance is minimized so that an overvoltage is minimized and thus it is more difficult for the electrolytic solution to be oxidatively decomposed.

According to the present invention, a positive electrode active material for a lithium ion secondary battery, a positive electrode for a lithium ion secondary battery, and a lithium ion secondary battery using these in which gas generation during charging and discharging is minimized can be provided.

DETAILED DESCRIPTION OF THE INVENTION

Figure 1:
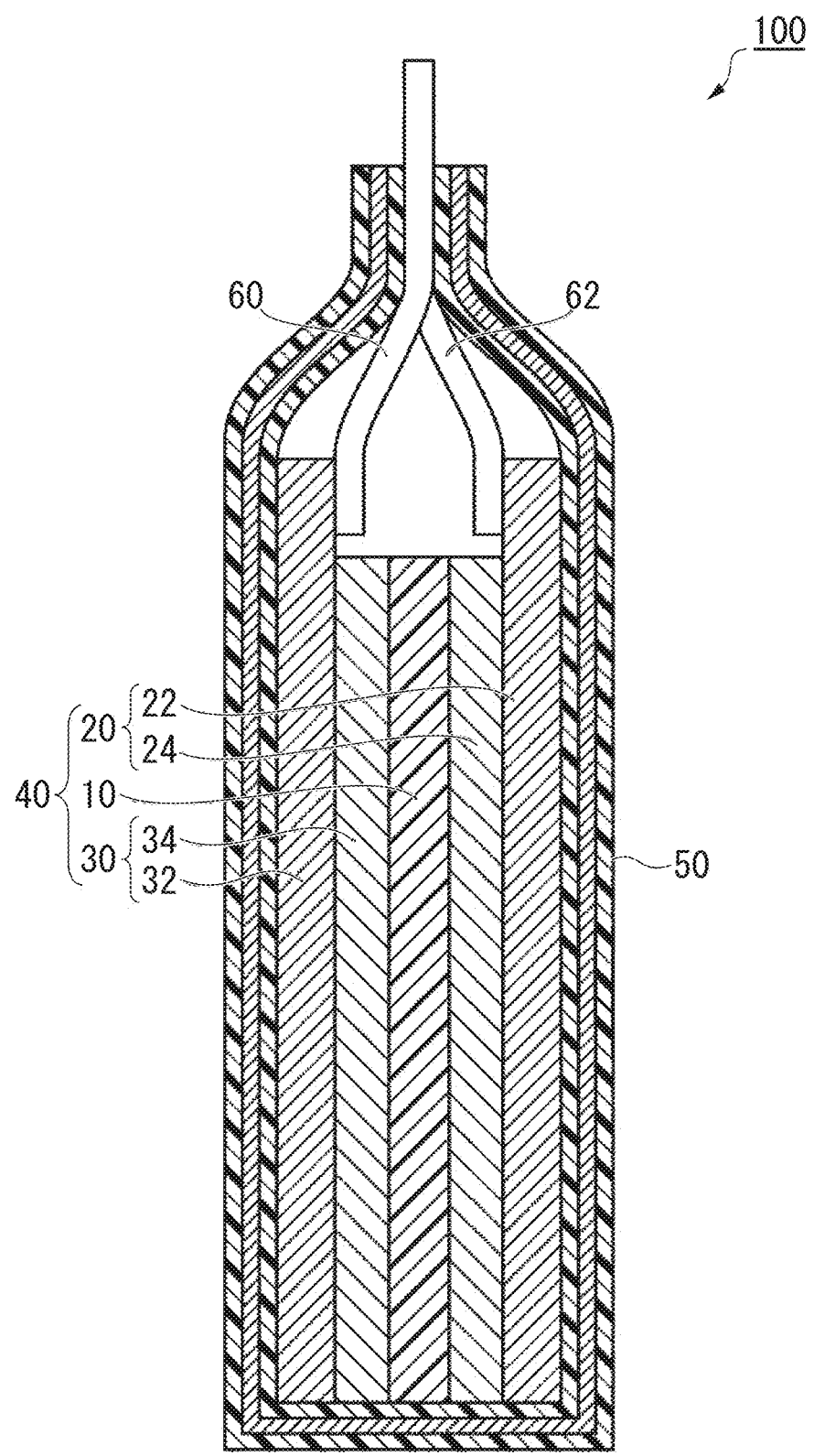
FIG. 1 is a schematic cross-sectional view of a lithium ion secondary battery according to an embodiment of the present invention.

A preferred embodiment of a lithium ion secondary battery according to the present invention will be described in detail with reference to the drawings. Here, the lithium ion secondary battery according to the present invention is not limited to the following embodiment. Note that dimensional proportions of constituent elements illustrated in the drawings are an example and the present invention is not limited thereto.

(Lithium Ion Secondary Battery)

Electrodes and the lithium ion secondary battery according to the embodiment will be described in brief with reference to FIG. 1. A lithium ion secondary battery 100 mainly includes a laminate 40, a case 50 configured to accommodate the laminate 40 in a sealed state, and a pair of leads 60 and 62 connected to the laminate 40. Although not illustrated in the drawing, the case 50 accommodates an electrolytic solution together with the laminate 40.

The laminate 40 is arranged to face each other so that a positive electrode (positive electrode for the lithium ion secondary batter) 20 and a negative electrode (negative electrode for the lithium ion secondary battery) 30 sandwich a separator 10. In the positive electrode 20, a positive electrode active material layer 24 is provided above a plate-like (film-like) positive electrode current collector 22. In the negative electrode 30, a negative electrode active material layer 34 is provided above a plate-like (film-like) negative electrode current collector 32. The positive electrode active material layer 24 and the negative electrode active material layer 34 are in contact with both sides of the separator 10. The leads 62 and 60 are connected to ends of the positive electrode current collector 22 and the negative electrode current collector 32 and ends of the leads 60 and 62 extend outside of the case 50.

Hereinafter, the positive electrode 20 and the negative electrode 30 may be collectively referred to as an electrode 20 or 30, the positive electrode current collector 22 and the negative electrode current collector 32 may be collectively referred to as a current collector 22 or 33, and the positive electrode active material layer 24 and the negative electrode active material layer 34 may be collectively referred to as an active material layer 24 or 34.

(Positive Electrode Active Material)

A positive electrode active material for the lithium secondary battery (hereinafter simply referred to as a "positive electrode active material") according to the embodiment will be described with reference to FIGS. 2 and 3. The positive electrode active material in the embodiment contains lithium vanadium phosphate represented by a following composition expression (1), the lithium vanadium phosphate has a β type (orthorhombic) crystalline phase illustrated in FIG. 3, and, for example, a diffraction pattern illustrated in FIG. 2 in X-ray diffraction is obtained:

$$Li_xVOPO_4 \quad (1)$$

(x satisfies 0.05≤x≤1.1).

Note that lithium vanadium phosphate represented by the composition expression (1) need not have the amount of oxygen of the stoichiometric composition expressed by the composition expression and oxygen deficient substances are also included broadly. In other words, substances that are identified as being of the same composition system by X-ray diffraction or the like are included in the definition of the lithium vanadium phosphate described above.

For this reason, a part of vanadium as well as lithium vanadium phosphate represented by the composition expression (1) may be substituted with at least one element selected from the group consisting of W, Mo, Ti, Al, Ni, Co, Mn, Fe, Zr, Cu, Zn, and Yb.

Figure 2:
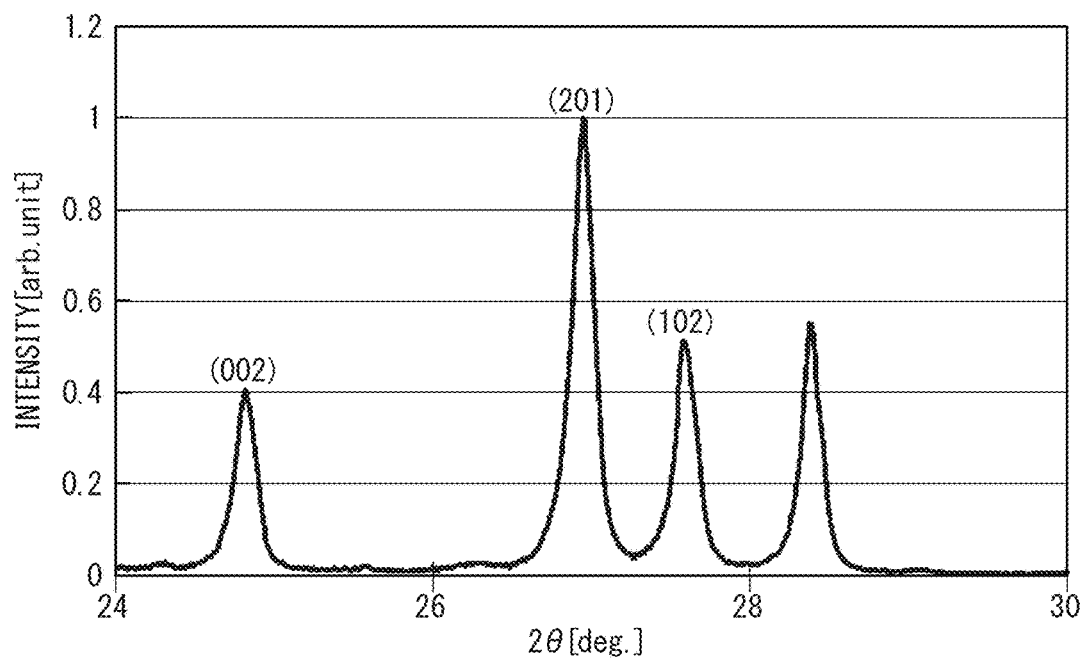
FIG. 2 illustrates an example of an X-ray diffraction pattern of a positive electrode active material for a lithium ion secondary battery according to an embodiment of the present invention.
Figure 3:
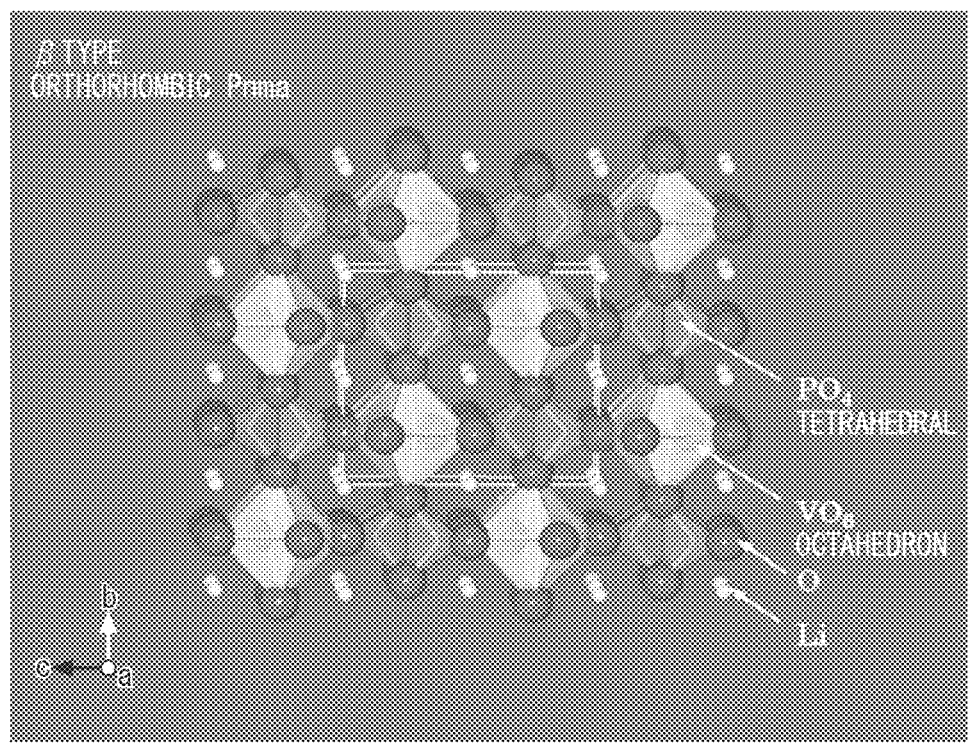
FIG. 3 is a schematic diagram of a crystal structure of a positive electrode active material for a lithium ion secondary battery according to an embodiment of the present invention.

In the diffraction pattern of lithium vanadium phosphate illustrated in FIG. 2, it is desirable that a peak intensity $((002)_{int}/(201)_{int})$ of a (002) plane normalized with respect to a peak intensity of a (201) plane and a peak intensity $((102)_{int}/(201)_{int})$ of a (102) plane normalized with respect to a peak intensity of the (201) plane satisfy $0.35 \leq (002)_{int}/(201)_{int} \leq 0.53$ and $0.46 \leq (102)_{int}/(201)_{int} \leq 0.63$.

If the peak intensities satisfy $0.35 \leq (002)_{int}/(201)_{int}$ and $0.46 \leq (102)_{int}/(201)_{int}$, reactivity with the electrolytic solution at an end of a lithium vanadium phosphate crystal during charging and discharging is minimized, and if the peak intensities satisfy $(002)_{int}/(201)_{int} \leq 0.53$ and $(102)_{int}/(201)_{int} \leq 0.63$, an overvoltage is minimized by minimizing an increase in resistance so that it is more difficult for the electrolytic solution to be subject to oxidative decomposition and thus gas generation is minimized during charging and discharging.

It is further desirable that the peak intensity $((002)_{int}/(201)_{int})$ of the (002) plane normalized with respect to the peak intensity of the (201) plane and the peak intensity $((102)_{int}/(201)_{int})$ of the (102) plane normalized with respect to the peak intensity of the (201) plane satisfy $0.39 \leq (002)_{int}/(201)_{int} \leq 0.44$ and $0.50 \leq (102)_{int}/(201)_{int} \leq 0.55$.

When the peak intensity ratio satisfies conditions in this range, reactivity with the electrolytic solution at the end of the lithium vanadium phosphate crystal during charging and discharging is further minimized and an overvoltage is further minimized by minimizing an increase in resistance so that it is more difficult for the electrolytic solution to be subject to oxidative decomposition and thus gas generation is further minimized during charging and discharging.

It is desirable that a primary particle diameter d of lithium vanadium phosphate contained in the positive electrode active material according to the embodiment satisfy 50 nm≤d≤500 nm.

If the primary particle diameter satisfies 50 nm≤d, a reaction area with the electrolytic solution is reduced so that it is difficult for the electrolytic solution to be subject to oxidative decomposition, and if the primary particle diameter satisfies d≤500 nm, an increase in resistance is minimized and an overvoltage is minimized so that gas generation is minimized during charging and discharging.

Although lithium vanadium phosphate contained in the positive electrode active material according to the embodiment has various crystal structures such as triclinic, orthorhombic, and tetragonal crystal structures, it is desirable to include lithium vanadium phosphate having an orthorhombic crystal structure.

A crystalline phase of lithium vanadium phosphate contained in the positive electrode active material according to the embodiment can be identified by X-ray diffraction or the like. A primary particle diameter of the lithium vanadium phosphate can be measured through scanning electron microscope (SEM) or transmission electron microscope (TEM) observation.

An X-ray diffraction pattern can be measured by, for example, an X-ray diffraction apparatus using a Cu-Kα line. Identification of a sample and a peak intensity of each surface index can be obtained using software or the like attached to the X-ray diffraction apparatus. Examples of the software include analysis software PDXL manufactured by Rigaku Corporation.

(Positive Electrode Current Collector)

The positive electrode current collector 22 may be a conductive plate material and, for example, a thin metal plate made of an aluminum, copper, or nickel foil.

(Positive Electrode Binder)

Binders bind active material and join the active material and the current collector 22. Any binders may be adopted as long as the binders can perform the above-described joining and examples of the binders include a fluorine resins such as polyvinylidene fluoride (PVDF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene polymer (ETFE), polychlorotrifluoroethylene (PCTFE), an ethylene-chlorotrifluoroethylene copolymer (ECTFE), and polyvinyl fluoride (PVF).

In addition to the above, examples of the binders include vinylidene fluoride type fluorine rubbers such as vinylidene fluoride-hexafluoropropylene type fluorine rubber (VDF-HFP type fluorine rubber), vinylidene fluoride-hexafluoropropylene-tetrafluoroethylene type fluorine rubber (VDF-HFPTFE type fluorine rubber), vinylidene fluoride-pentafluoropropylene type fluorine rubber (VDF-PFP type fluorine rubber), vinylidene fluoride-pentafluoropropylene-tetrafluoroethylene type fluorine rubber (VDF-PFP-TFE type fluorine rubber), vinylidene fluoride-perfluoromethyl vinyl ether-tetrafluoroethylene type fluorine rubber (VDF-PFMVE-TFE type fluorine rubber), and vinylidene fluoride-chlorotrifluoroethylene type fluorine rubber (VDF-CTFE type fluorine rubber).

As the binder, electron conductive polymers or ion conductive polymers may be used. Examples of electron conductive polymers include polyacetylene or the like. In this case, since binders also function as conductive materials, conductive materials need not be added to the binders. Examples of ion conductive polymers include substances and the like obtained by combining polymer compounds such as polyethylene oxides and polypropylene oxides with lithium salts or alkali metal salts with lithium as a main component.

(Negative Electrode Active Material)

Any negative electrode active material may be adopted as long as the negative electrode active materials are compounds capable of occluding/releasing lithium ions. In addition, known negative electrode active materials for a lithium ion battery can be used as negative electrode active materials. Examples of negative electrode active materials include carbon materials capable of occluding/releasing lithium ions such as graphite (natural graphite and artificial graphite), carbon nanotubes, non-graphitizable carbon, easily graphitized carbon, and low temperature calcined carbon, metals which are capable of combining with lithium as main components, such as aluminum, silicon, tin, and the like, and amorphous compounds, such as oxides such as silicon dioxide, and tin dioxide, and lithium titanate ($Li_4Ti_5O_{12}$), or the like. It is desirable to use relatively stable graphite having a high capacity per unit weight.

(Negative Electrode Current Collector)

Any negative electrode current collector 32 may be adopted as long as the negative electrode current collector 32 is a conductive plate material and, for example, a thin metal plate made of an aluminum, copper, or nickel foil may be used.

(Negative Electrode Conductive Material)

Examples of conductive material s include conductive materials such as carbon-based materials such as carbon powders such as carbon black, and carbon nanotubes, fine metal powders such as copper, nickel, stainless steel, and iron, a mixture of a carbon material and a fine metal powder, and conductive oxides such as ITO.

(Negative Electrode Binder)

As binders for the negative electrode, the same as those used for the positive electrode can be used.

(Separator)

Any separator 18 may be adopted as long as the separator 18 is formed to have an electrically insulating porous structure, and examples of the separator 18 include a single-layered film made of polyethylene, polypropylene, or a polyolefin, an extended film or a laminate of a mixture of the above resins, or a fiber nonwoven fabric made of at least one constituent material selected from the group consisting of cellulose, polyester, and polypropylene.

(Non-Aqueous Electrolytic Solution)

The non-aqueous electrolytic solution may contain an electrolyte dissolved in a non-aqueous solvent and cyclic carbonates and chain carbonates may be contained as a non-aqueous solvent.

The cyclic carbonates are not particularly limited as long as the cyclic carbonates can be used as solvents and known cyclic carbonates can be used as the cyclic carbonates. Examples of the cyclic carbonates include ethylene carbonate, propylene carbonate, butylene carbonate, and the like.

The chain carbonates are not particularly limited as long as the chain carbonates can reduce the viscosity of the cyclic carbonates and known cyclic carbonates can be used as the cyclic carbonates. Examples of chain carbonates include diethyl carbonate, dimethyl carbonate, and ethyl methyl carbonate. In addition, methyl acetate, ethyl acetate, methyl propionate, ethyl propionate, γ-butyrolactone, 1,2-dimethoxyethane, 1,2-diethoxyethane, and the like may used by being mixed in.

It is desirable that a ratio between cyclic carbonates and chain carbonates in a non-aqueous solvent be set to 1:9 to 1:1.

Examples of the electrolytes may include lithium salts such as $LiPF_6$, $LiClO_4$, $LiBF_4$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. Note that one kind of lithium salt among these lithium salts may be independently used or two or more kinds of lithium salts may be used in combination. Particularly, it is desirable to include $LiPF_6$ in view of conductivity.

When $LiPF_6$ is dissolved in a non-aqueous solvent, it is desirable that the concentration of an electrolyte in a non-aqueous electrolytic solution be adjusted to 0.5 to 2.0 mol/L. When the concentration of the electrolyte is equal to or more than 0.5 mol/L, sufficient conductivity for the non-aqueous electrolytic solution can be secured and sufficient capacity can easily be obtained during charging and discharging. When the concentration of the electrolyte is minimized to being within 2.0 mol/L an increase in viscosity of the non-aqueous electrolytic solution is minimized, sufficient mobility of the lithium ions can be secured, and a sufficient capacity can easily be obtained during charging and discharging.

Also in the case of mixing $LiPF_6$ with other electrolytes, a lithium ion concentration in the non-aqueous electrolytic solution is preferably adjusted to 0.5 to 2.0 mol/L, and 50 mol % or more of a lithium ion concentration from $LiPF_6$ is more preferably included.

(Method for Producing Positive Electrode Active Material)

The positive electrode active material according to the embodiment can be produced by the following precursor synthesizing, water washing, and calcining.

(Precursor Synthesizing)

The precursor synthesizing is a step of obtaining a lithium vanadium phosphate precursor paste by mixing a lithium source, a vanadium source, and a phosphoric acid source.

To be specific, as the lithium source, lithium hydroxide, lithium carbonate, lithium chloride, lithium nitrate, lithium sulfate, or lithium acetate can be used.

To be specific, as the vanadium source, vanadium oxides such as vanadium pentoxide and ammonium vanadate can be used.

To be specific, as the phosphoric acid source, phosphoric acid, ammonium phosphate, monoammonium phosphate, or diammonium phosphate can be used.

Also, as the lithium source and the phosphoric acid source, lithium dihydrogen phosphate, di-lithium hydrogen phosphate, lithium phosphate, or the like may be used.

A mixture of two or more kinds of substance selected from the foregoing substances may be used as the lithium source, the vanadium source, and the phosphoric acid source.

When two or more kinds of lithium source, vanadium source, and phosphoric acid source are mixed and used, a molar ratio between lithium, vanadium, and phosphorus is preferably adjusted to a value close to a molar ratio of a target compound.

Contents of the lithium source, the vanadium source, and the phosphoric acid source may satisfy $0.95 \leq \text{mol(Li)/mol(V)} \leq 1.05$ and $0.95 \leq \text{mol(PO}_4)/\text{mol(V)} \leq 1.05$ and preferably satisfy $1.0 \leq \text{mol(Li)/mol(V)} \leq 1.03$ and $1.0 \leq \text{mol(PO}_4)/\text{mol(V)} \leq 1.03$ in a molar ratio of lithium, vanadium, and phosphoric acid.

It is desirable to perform heating after mixing. To be specific, heating is preferably performed in a range of 70° C. to 100° C. for 10 hours to 30 hours.

A lithium vanadium phosphate precursor paste can be obtained through these steps.

(Water Washing)

The water washing is a step of mixing the lithium vanadium phosphate precursor paste obtained in the precursor synthesizing, water, and an acid and then performing filtration.

As the acid, at least one selected from sulfuric acid, nitric acid, and hydrochloric acid can be used. The acid may satisfy $0.001 \leq \text{mol(acid)/mol(Li)} \leq 0.01$ in terms of molar ratio with respect to the lithium source.

It is desirable to use a filter with a filtration accuracy of 1 to 10 um for filtration. It is desirable to wash deposits of lithium vanadium phosphate precursor obtained by filtration using an amount of water greater than or equal to that of the deposits.

It is therefore assumed that trace amounts of unreacted substances and by-products contained in the lithium vanadium phosphate precursor were removed such that there was no influence on the obtained peak intensity ratios in X-ray diffraction patterns of lithium vanadium phosphate.

The lithium vanadium phosphate precursor washed with water can be obtained through these steps.

(Calcining)

The calcining is a step of calcining the water-washed lithium vanadium phosphate precursor obtained in the water washing to obtain lithium vanadium phosphate.

The calcining may be performed using various conditions such as in the atmosphere, in an argon atmosphere, or in a nitrogen atmosphere. The calcining is preferably performed in an atmosphere containing 15% or more of oxygen.

In the calcining, a target lithium vanadium phosphate can be obtained in a high yield by calcining in a temperature range of 500° C. to 600° C. for three hours to six hours. It is desirable to perform calcination in a temperature range of 540° C. to 570° C. for four hours to five hours. Thus, it is possible to reduce the content of crystalline phases other than target phases.

A peak intensity ratio of an X-ray diffraction pattern of lithium vanadium phosphate can be controlled using the water washing and calcining conditions. Particularly, although the mixture is mixed with an acid and then is washed with water in the water washing, this greatly contributes to controlling the peak intensity ratio of the X-ray diffraction pattern of lithium vanadium phosphate and an LVP having a peak intensity ratio of a characteristic X-ray diffraction pattern according to the embodiment can be obtained.

(Method for Producing Electrode 20 or 30)

Next, a method for producing an electrode 20 or 30 according to the embodiment will be described.

The active material, the binder, and the solvent are mixed. A conductive material may be further added if necessary. Examples of the solvent may include water, N-methyl-2-pyrrolidone, or the like. A method for mixing components constituting a coating material is not particularly limited and the order of mixing the components is not particularly limited. The coating material is applied to the current collector 22 or 32. A coating method is not particularly limited, and a method adopted usually when an electrode is prepared can be used, and, for example, may be a slit coating method and a doctor blade method.

Subsequently, the solvent in the coating material applied on the current collector 22 or 32 is removed. A removal method is not particularly limited and a coating material may be dried, for example, in an atmosphere of 80° C. to 150° C.

Thus, an electrode on which the positive electrode active material layer 24 and the negative electrode active material layer 34 are formed is pressed by a roll press machine or the like if necessary. A linear pressure of the roll press can be set to, for example, 1000 kgf/cm.

An electrode in which the electrode active material layer 24 or 34 is formed above the current collector 22 or 32 is obtained through the above steps.

(Method for Producing Lithium Ion Secondary Battery)

Next, a method for producing a lithium ion secondary battery according to the embodiment will be described. The method for producing the lithium ion secondary battery according to the embodiment includes sealing the positive electrode 20 containing the above-described active material, the separator 10 sandwiched between the negative electrode 30, the positive electrode, and the negative electrode, and a non-aqueous electrolytic solution containing a lithium salt in an exterior body 50.

For example, the positive electrode 20 containing the above-described active material, the negative electrode 30, and the separator 10 are laminated, the positive electrode 20 and the negative electrode 30 are heated and pressed by a press tool in a direction which is perpendicular to the laminating direction, and the positive electrode 20, the separator 10, and the negative electrode 30 are brought into close contact with each other. Moreover, for example, a lithium ion secondary battery can be prepared by introducing the laminate 40 into the bag-shaped exterior body 50 prepared in advance and injecting a non-aqueous electrolytic solution containing the lithium salt into the exterior body. Note that the laminate 40 may be impregnated into the non-aqueous electrolytic solution containing the lithium salt in advance instead of injecting the non-aqueous electrolytic solution containing the lithium salt into the exterior body.

Note that the present invention is not limited to the above embodiment. The above embodiment is merely an example and has substantially the same constitution as the technical idea described in the claims of the present invention, and all embodiments that exert the same action and effects are included in the technical scope of the present invention.

EXAMPLES

Hereinafter, effects of the present invention will be further clarified using examples. Note that the present invention is not limited to the following examples, and can be realized with appropriate modifications without departing from the gist of the present invention.

Example 1

(Preparation of Positive Electrode Active Material)

LiOH.H$_2$O, V$_2$O$_5$, and H$_3$PO$_4$ were mixed at a molar ratio of 2:1:2, a lithium vanadium phosphate precursor paste obtained by heating the mixture of LiOH.H$_2$O, V$_2$O$_5$, and H$_3$PO$_4$ at 80° C. for 20 hours, water in an amount equal to that of the lithium vanadium phosphate precursor paste, and sulfuric acid of 0.2% in molar ratio with respect to LiOH were mixed, a deposit obtained by filtration was calcined in air at 550° C. for four hours, and thus lithium vanadium phosphate was obtained.

(Measurement of X-Ray Diffraction Pattern)

An X-ray diffraction pattern of lithium vanadium phosphate was measured using an X-ray diffraction apparatus. From the measurement result, it was confirmed that a positive electrode active material was β type (orthorhombic) lithium vanadium phosphate having the X-ray diffraction pattern as illustrated in FIG. 2.

(Preparation of Positive Electrode)

A slurry was prepared by dispersing 80% of lithium vanadium phosphate obtained in this way, 10% of acetylene black, and 10% of polyvinylidene fluoride (PVDF) in N-methyl-2-pyrrolidone (NMP). The obtained slurry was applied on an aluminum foil having a thickness of 15 μm, dried at a temperature of 120° C. for 30 minutes, and then pressed at a linear pressure of 1000 kgf/cm using a roll press machine to obtain a positive electrode.

(Preparation of Negative Electrode)

A slurry was prepared by dispersing 90 parts by mass of a natural graphite powder as a negative electrode active material and 10 parts by mass of PVDF in NMP. The obtained slurry was applied on a copper foil having a thickness of 15 Lm, dried under reduced pressure at a temperature of 140° C. for 30 minutes, and then pressed using a roll press machine to obtain a negative electrode.

(Non-Aqueous Electrolytic Solution)

A non-aqueous electrolytic solution obtained by dissolving LiPF$_6$ and LiBF$_4$ in a mixed solvent of ethylene carbonate (EC) and diethyl carbonate (DEC) such that there was 1.0 mol/L and 0.1 mol/L of LiPF$_6$ and LiBF$_4$, respectively, was prepared. A volume ratio of EC and DEC in the mixed solvent was set to satisfy EC:DEC=30:70.

(Separator)

A polyethylene micro-porous film (porosity: 40% and shutdown temperature: 134° C.) having a film thickness of 20 m was prepared.

(Preparation of Battery)

A power generating element was constructed by stacking the positive electrode, the negative electrode, and the separator and a battery cell of Example 1 was prepared using the power generating element and the non-aqueous electrolytic solution.

(C Rate)

A current density at which a capacity of a battery cell is charged or discharged in one hour is referred to as 1 C and a current density at the time of charging or discharging is represented by a constant multiple of a C rate in the following description (for example, a current density which is half that of 1 C is expressed as 0.5 C).

(Charging or Discharging)

Constant current charging was performed at a current density of 1 C until a voltage reached 4.2 V using the prepared battery cell of Example 1 and constant voltage charging was performed at 4.2 V until the current density decreased to 0.05 C.

Subsequently, after a pause of five minutes, constant voltage discharging was performed at a current density of 0.1 C until the voltage reached 2.8 V. In a current density, calculation was performed on the assumption that 1 C was 158 mAh/g in terms of positive electrode active material weight.

(Measurement of Amount of Gas Generation)

Charging or discharging order was repeated 500 times and the amount of gas generation was measured. The Archimedes method was used to measure the amount of gas generation. To be specific, battery cells were immersed in pure water, their buoyancies were measured, and the amounts of gas generation were obtained from volumes of pushed water.

Examples 2 to 11 and Comparative Examples 1 to 4

In Examples 2 to 11 and Comparative Examples 1 to 4, a peak intensity ratio of an X-ray diffraction pattern of lithium vanadium phosphate was adjusted by appropriately adjusting amounts of water or acid mixed in during water washing and a calcining atmosphere or a calcining temperature/time in calcining, battery cells were prepared as in Example 1, and evaluation was performed. Results are represented in Table 1.

TABLE 1

| | Water washing | | | Calcining | | | X-ray diffraction pattern intensity | | Amount of gas |
|---|---|---|---|---|---|---|---|---|---|
| | Amount of water with respect to precursor paste | Kind of acid | Amount of acid to LiOH (molar ratio) | Calcining atmosphere | Calcining temperature | Calcining time | $(002)_{int}/(201)_{int}$ | $(102)_{int}/(201)_{int}$ | generation [cc/g] |
| Example 1 | 100% | H$_2$SO$_4$ | 0.2% | Air | 550° C. | Four hours | 0.41 | 0.52 | 0.6 |
| Example 2 | 100% | H$_2$SO$_4$ | 0.3% | Air | 550° | four hours | 0.42 | 0.53 | 0.8 |
| Example 3 | 100% | H$_2$SO$_4$ | 0.1% | Air | 550° | four hours | 0.37 | 0.48 | 1.3 |
| Example 4 | 100% | H$_2$SO$_4$ | 0.5% | Air | 550° | four hours | 0.46 | 0.57 | 1.2 |
| Example 5 | 100% | H$_2$SO$_4$ | 1.0% | Air | 550° | four hours | 0.51 | 0.61 | 1.4 |
| Example 6 | 125% | H$_2$SO$_4$ | 0.2% | Air | 550° | four hours | 0.43 | 0.54 | 0.8 |
| Example 7 | 100% | HCl | 0.3% | Air | 550° | four hours | 0.4 | 0.51 | 0.7 |

TABLE 1-continued

| | Water washing | | | Calcining | | | X-ray diffraction pattern intensity | | Amount of gas |
|---|---|---|---|---|---|---|---|---|---|
| | Amount of water with respect to precursor paste | Kind of acid | Amount of acid to LiOH (molar ratio) | Calcining atmosphere | Calcining temperature | Calcining time | $(002)_{int}/(201)_{int}$ | $(102)_{int}/(201)_{int}$ | generation [cc/g] |
| Example 8 | 100% | $HNO_3$ | 0.3% | Air | 550° | four hours | 0.41 | 0.51 | 0.7 |
| Example 9 | 100% | $H_2SO_4$ | 0.2% | $O_2$ (30%) + $N_2$ (70%) | 550° | four hours | 0.45 | 0.56 | 1.1 |
| Example 10 | 100% | $H_2SO_4$ | 0.2% | Air | 550° | six hours | 0.42 | 0.54 | 0.7 |
| Example 11 | 100% | $H_2SO_4$ | 0.2% | Air | 520° | four hours | 0.38 | 0.49 | 1.1 |
| Comparative Example 1 | — | — | — | Air | 550° | four hours | 0.29 | 0.40 | 3.4 |
| Comparative Example 2 | 50% | — | — | Air | 550° | four hours | 0.33 | 0.44 | 2.2 |
| Comparative Example 3 | 150% | $H_2SO_4$ | 2.0% | Air | 550° | four hours | 0.55 | 0.65 | 2.1 |
| Comparative Example 4 | 150% | $H_2SO_4$ | 2.0% | $O_2$ (30%) + $N_2$ (70%) | 550° | four hours | 0.59 | 0.68 | 2.4 |

It can be seen from Table 1 that gas generation during charging and discharging was minimized if a peak intensity $((002)_{int}/(201)_{int})$ of a (002) plane normalized with respect to a peak intensity of a (201) plane and a peak intensity $((102)_{int}/(201)_{int})$ of a (102) plane normalized with respect to the peak intensity of the (201) plane satisfy $0.35 \leq (002)_{int}/(201)_{int} \leq 0.53$ and $0.46 \leq (102)_{int}/(201)_{int} \leq 0.63$, respectively.

As is clear from the above-described evaluation results, it can be confirmed that gas generation during charging and discharging in the examples is minimized as compared with in the comparative examples.

While a preferred embodiment of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Separator
20 Positive electrode
22 Positive electrode current collector
24 Positive electrode active material layer
30 Negative electrode
32 Negative electrode current collector
34 Negative electrode active material layer
40 Power generating element
50 Exterior body
52 Metal foil
54 Polymer film
60, 62 Lead
100 Lithium ion secondary battery

What is claimed is:

1. A positive electrode active material for a lithium ion secondary battery comprising:
lithium vanadium phosphate represented by a following composition expression (1) and in which a peak intensity $((002)_{int}/(201)_{int})$ of a (002) plane normalized with respect to a peak intensity of a (201) plane and a peak intensity $((102)_{int}/(201)_{int})$ of a (102) plane normalized with respect to a peak intensity of the (201) plane in an X-ray diffraction pattern satisfy $0.35 \leq (002)_{int}/(201)_{int} \leq 0.53$ and $0.46 \leq (102)_{int}/(201)_{int} \leq 0.63$, respectively:

$$Li_xVOPO_4 \quad (1)$$

where x satisfies $0.05 \leq x \leq 1.1$.

2. The positive electrode active material for the lithium ion secondary battery according to claim 1, wherein $(002)_{int}/(201)_{int}$ and $(102)_{int}/(201)_{int}$ satisfy $0.39 \leq (002)_{int}/(201)_{int} \leq 0.44$ and $0.50 \leq (102)_{int}/(201)_{int} \leq 0.55$, respectively.

3. A positive electrode for a lithium ion secondary battery using the positive electrode active material for the lithium ion secondary battery according to claim 1.

4. A positive electrode for a lithium ion secondary battery using the positive electrode active material for the lithium ion secondary battery according to claim 2.

5. A lithium ion secondary battery comprising:
the positive electrode for the lithium ion secondary battery according to claim 3;
a negative electrode containing a negative electrode active material;
a separator sandwiched between the positive electrode for the lithium ion secondary battery and the negative electrode active material; and
a non-aqueous electrolyte.

6. A lithium ion secondary battery comprising:
the positive electrode for the lithium ion secondary battery according to claim 4;
a negative electrode containing a negative electrode active material;
a separator sandwiched between the positive electrode for the lithium ion secondary battery and the negative electrode active material; and
a non-aqueous electrolyte.

7. The positive electrode active material for the lithium ion secondary battery according to claim 1, wherein a primary particle diameter of the lithium vanadium phosphate satisfy $50 \text{ nm} \leq d \leq 500 \text{ nm}$.

* * * * *